(12) United States Patent
Liu

(10) Patent No.: US 10,971,094 B1
(45) Date of Patent: Apr. 6, 2021

(54) PIXEL DRIVING CIRCUIT AND LIQUID CRYSTAL DISPLAY DEVICE

(71) Applicant: Shenzhen China Star Optoelectronics Technology Co., Ltd., Shenzhen (CN)

(72) Inventor: Siyang Liu, Shenzhen (CN)

(73) Assignee: SHENZHEN CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 341 days.

(21) Appl. No.: 16/319,311

(22) PCT Filed: Sep. 26, 2018

(86) PCT No.: PCT/CN2018/107774
§ 371 (c)(1),
(2) Date: Jan. 18, 2019

(87) PCT Pub. No.: WO2020/015175
PCT Pub. Date: Jan. 23, 2020

(30) Foreign Application Priority Data

Jul. 17, 2018 (CN) .......................... 201810786069.X

(51) Int. Cl.
*G09G 3/36* (2006.01)
*G02F 1/1362* (2006.01)
(Continued)

(52) U.S. Cl.
CPC ......... *G09G 3/3648* (2013.01); *G02F 1/1368* (2013.01); *G02F 1/13306* (2013.01);
(Continued)

(58) Field of Classification Search
CPC ........... G02F 1/1362; G02F 1/13; G09G 3/36; G09G 5/00; G06F 3/038
See application file for complete search history.

(56) References Cited

U.S. PATENT DOCUMENTS 7,800,569 B2 * 9/2010 Chen .................... G09G 3/3659
345/92
2003/0095223 A1 * 5/2003 Song ................. G02F 1/133707
349/141

(Continued)

FOREIGN PATENT DOCUMENTS

CN 105842947 A 8/2016
CN 106950768 A 7/2017
CN 108169969 A 6/2018

*Primary Examiner* — Pegeman Karimi
(74) *Attorney, Agent, or Firm* — Leong C. Lei

(57) ABSTRACT

The invention provides a pixel driving circuit and LCD device. The pixel driving circuit electrically connects the drain of the third TFT of each sub-pixel in the N-th sub-pixel row to the first end of the second LC capacitor of a corresponding sub-pixel of the (N+1)th row. When driving, when scanning the N-th sub-pixel row, the third TFT of the N-th sub-pixel row turns on to release the voltage at the first end of the second LC capacitor of the N-th sub-pixel row to the first end of the second LC capacitor of the (N+1)th sub-pixel row, and does not affect the voltage on the array substrate common voltage line, thereby effectively ensuring consistent voltage value for various areas on the array substrate common voltage line. When applied to LCD device, the invention can improve the display quality of the LCD device.

18 Claims, 4 Drawing Sheets

(51) Int. Cl.
    *G02F 1/1368*     (2006.01)
    *G02F 1/133*     (2006.01)
    *G02F 1/1335*     (2006.01)

(52) U.S. Cl.
    CPC .... *G02F 1/13624* (2013.01); *G02F 1/133514* (2013.01); *G02F 1/136286* (2013.01); *G09G 2320/0242* (2013.01)

(56) References Cited

U.S. PATENT DOCUMENTS

| | | | |
|---|---|---|---|
| 2009/0231505 A1 | 9/2009 | Wang | |
| 2012/0313915 A1* | 12/2012 | Li | G09G 3/3659 345/211 |
| 2016/0055807 A1* | 2/2016 | Lee | G09G 3/36 345/205 |
| 2017/0108723 A1* | 4/2017 | No | G02F 1/136286 |
| 2018/0350317 A1* | 12/2018 | Shin | G09G 3/3648 |
| 2019/0310509 A1* | 10/2019 | Shin | H01L 27/1255 |

\* cited by examiner

PIXEL DRIVING CIRCUIT AND LIQUID CRYSTAL DISPLAY DEVICE

BACKGROUND OF THE INVENTION

1. Field of the Invention

The present invention relates to the field of display and, in particular, to the field of pixel driving circuit and liquid crystal display (LCD) device.

2. The Related Arts

The liquid crystal display (LCD) device, providing many advantages, such as thinness, power saving, and radiation-free, has been used in a wide range of applications, such as, liquid crystal (LC) TV, mobile phone, personal digital assistant (PDA), digital camera, computer monitor or notebook PC monitor and becomes a mainstream flat display device.

Most of the LCD devices in the current market are backlight type LCDs, which comprise an LCD panel and a backlight module. The operating principle of the LCD panel is to place liquid crystal (LC) molecules between a color filter (CF) substrate, a thin film transistor (TFT) array substrate. A plurality of vertical and horizontal fine wires is disposed between two substrates, and the orientation of LC molecules controlled by the electric field generated by the current flowing through wires will refract the light from the backlight module to produces an image.

With the continuous development of display technology, consumers put increasing higher demands on the image quality of TFT-LCD. At present, when designing the pixel driving circuit of the TFT-LCD, a sub-pixel is separated into a main area (Main) and a sub-area (Sub), and the voltage differences between the two ends of the LC capacitors of the main area and the sub-area are different to achieve the effect of improving the color shift of TFT-LCD at large view angle. FIG. 1 is a schematic view of the structure of a conventional pixel driving circuit. The pixel driving circuit comprises a plurality of sub-pixels 100 arranged in an array, and a plurality of data lines 200 respectively connected to the plurality of columns of sub-pixels 100 (d(1), d(2), . . . d(m), . . . ), a plurality of rows of scan lines 300 respectively connected to the plurality of rows of sub-pixels 100 (g(1), g(2), g(n) . . . ) and an array substrate common voltage line 400. The array substrate common voltage line 400 is for receiving an array substrate common voltage Acom. Each sub-pixel 100 comprises a first TFT T10, a first LC capacitor C11, a first storage capacitor C21, a second TFT T20, a third TFT T30, a second LC capacitor C12, and a second storage capacitor C22; the first TFT T10, the first LC capacitor C11, and the first storage capacitor C21 form a main area 110, and the second TFT T20, the third TFT T30, the second LC capacitor C12, and the second storage capacitor C22 form a sub-area 120. The first TFT T10 has a gate electrically connected to a corresponding scan line 300, a source electrically connected to a corresponding data line 200, and a drain electrically connected to a first end of the first LC capacitor C11. A second end of the first LC capacitor C11 is grounded. The first storage capacitor C21 has a first end electrically connected to the first end of the first LC capacitor C11, and the other end electrically connected to the array substrate common voltage line 400. The second TFT T20 has a gate electrically connected to a corresponding scan line 300, a source electrically connected to a corresponding data line 200, and a drain electrically connected to a first end of the second LC capacitor C12. The second LC capacitor C12 has a second end grounded. The second storage capacitor C22 has a first end electrically connected to the first end of the second LC capacitor C12, and the other end is electrically connected to the array substrate common voltage line 400. The third TFT T30 has a gate electrically connected to a corresponding scan line 300, a source electrically connected to the first end of the second liquid crystal capacitor C12, and a drain electrically connected to the array substrate common voltage line 400. When the pixel driving circuit is in operation, when the n-th scan line g(n) controls the first TFT T10, the second TFT T20, and the third TFT T30 in the n-th sub-pixel 100 to turn on, the data signal on the data line 200 is written into the first end of the first LC capacitor C11, and after the corresponding second TFT T20 writes into the first end of the second LC, releases to the array substrate common voltage line 400 through the third TFT T30, so that the voltage difference between the two ends of the first LC capacitor C11 in a sub-pixel 100 is different from the voltage difference between the two ends of the second LC capacitor C12, so as to improve the color-shift at large view angle. However, in the pixel driving circuit shown in FIG. 1, the voltage at one end of the second LC capacitor C12 is released to the array substrate common voltage line 400, which causes the array substrate common voltage Acom on the array substrate common voltage line 400 to change to deviate from the initially set voltage value, causing different voltage values in different areas of the array substrate common voltage line 400, resulting in abnormal display of the image.

SUMMARY OF THE INVENTION

The primary object of the present invention is to provide a pixel driving circuit, able to ensure the voltage values of the respective areas on the array substrate common voltage line consistent, and improve the LCD display quality when applied to the LCD device.

Another object of the present invention is to provide an LCD device, with consistent voltage values of the respective areas on the array substrate common voltage line.

To achieve the above objects, the present invention provides a pixel driving circuit, which comprises: a plurality of sub-pixels arranged in an array, a plurality of scan lines respectively corresponding to a plurality of rows of sub-pixels, a plurality of data lines respectively corresponding to a plurality of columns of sub-pixels, and an array substrate common voltage line;

the sub-pixel comprising: a first thin film transistor (TFT), a first liquid crystal (LC) capacitor, a first storage capacitor, a second TFT, a third TFT, a second LC capacitor, and a second storage capacitor;

in each sub-pixel, the first TFT having a gate electrically connected to a corresponding scan line, a source electrically connected to a corresponding data line, and a drain electrically connected to a first end of the first LC capacitor; the first LC capacitor having a second end connected to a color filter (CF) substrate common voltage; the first storage capacitor having a first end electrically connected to the first end of the first LC capacitor, and a second end electrically connected to the array substrate common voltage line; the second TFT having a gate electrically connected to a corresponding scan line, a source electrically connected to a corresponding data line, and a drain electrically connected to a first end of the second LC capacitor; the second LC capacitor having a second end electrically connected to the CF substrate common voltage; the second storage capacitor having a first end electrically connected to the first end of the second LC capacitor, and a second end electrically connected to the array substrate common voltage line; the third TFT having a gate electrically connected to a corresponding scan line, and a source electrically connected to the first end of the second LC capacitor;

for an integer N, except for the last row of sub-pixels, in the N-th row of sub-pixels, the drain of the third TFT of each sub-pixel being electrically connected to the first end of the second LC capacitor of a corresponding sub-pixel in the (N+1)th row of sub-pixels.

For an integer M, except the last row of sub-pixels, the drain of the third TFT of the N-th row, M-th column sub-pixel is electrically connected to the first end of the second LC capacitor of the (N+1)th row, M-th column sub-pixel.

The array substrate common voltage line receives an array substrate common voltage.

The second end of the first LC capacitor is grounded, the second end of the second LC capacitor is grounded, and the CF substrate common voltage is a ground voltage.

The drain of the third TFT of the last row of sub-pixels is electrically connected to the array substrate common voltage line.

In the last row of sub-pixels, the drain of the third TFT of each sub-pixel is electrically connected to the first end of the second LC capacitor of a corresponding sub-pixel of the first row of sub-pixels.

The drain of the third TFT of the M-th sub-pixel of the last row is electrically connected to the first end of the second LC of the M-th sub-pixel of the first row.

The first TFT, the second TFT, and the third TFT are all N-type TFTs.

The first TFT, the second TFT, and the third TFT are all amorphous silicon (a-Si) TFTs, low temperature polysilicon (LTPS) TFTs or oxide semiconductor TFTs.

The present invention also provides an LCD device, which comprises the above pixel driving circuit.

The present invention provides the following advantages: the pixel driving circuit of the present invention electrically connects the drain of the third TFT of each sub-pixel in the N-th sub-pixel row to the first end of the second LC capacitor of a corresponding sub-pixel of the (N+1)th row. When driving, when scanning the N-th sub-pixel row, the third TFT of the N-th sub-pixel row turns on to release the voltage at the first end of the second LC capacitor of the N-th sub-pixel row to the first end of the second LC capacitor of the (N+1)th sub-pixel row, and does not affect the voltage on the array substrate common voltage line, thereby effectively ensuring consistent voltage value for various areas on the array substrate common voltage line. When applied to LCD device, the invention can improve the display quality of the LCD device. The LCD device of the present invention provides the same voltage value for each area on the array substrate common voltage line, and the display quality is good.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort.

DETAILED DESCRIPTION OF THE PREFERRED EMBODIMENTS

To further explain the technical means and effect of the present invention, the following refers to embodiments and drawings for detailed description. Apparently, the described embodiments are merely some embodiments of the present invention, instead of all embodiments. All other embodiments based on embodiments in the present invention and obtained by those skilled in the art without departing from the creative work of the present invention are within the scope of the present invention.

The terms "comprising" and "having" and any variations thereof appearing in the specification, claims, and drawings of the present application are intended to cover non-exclusive inclusion. For example, a process, method, system, product, or device that includes a series of steps or units is not limited to the listed steps or units, but optionally also includes steps or units not listed, or alternatively, other steps or units inherent to these processes, methods, products or equipment. In addition, the terms "first", "second" and "third" are used to distinguish different objects and not intended to describe a particular order.

Figure 1:
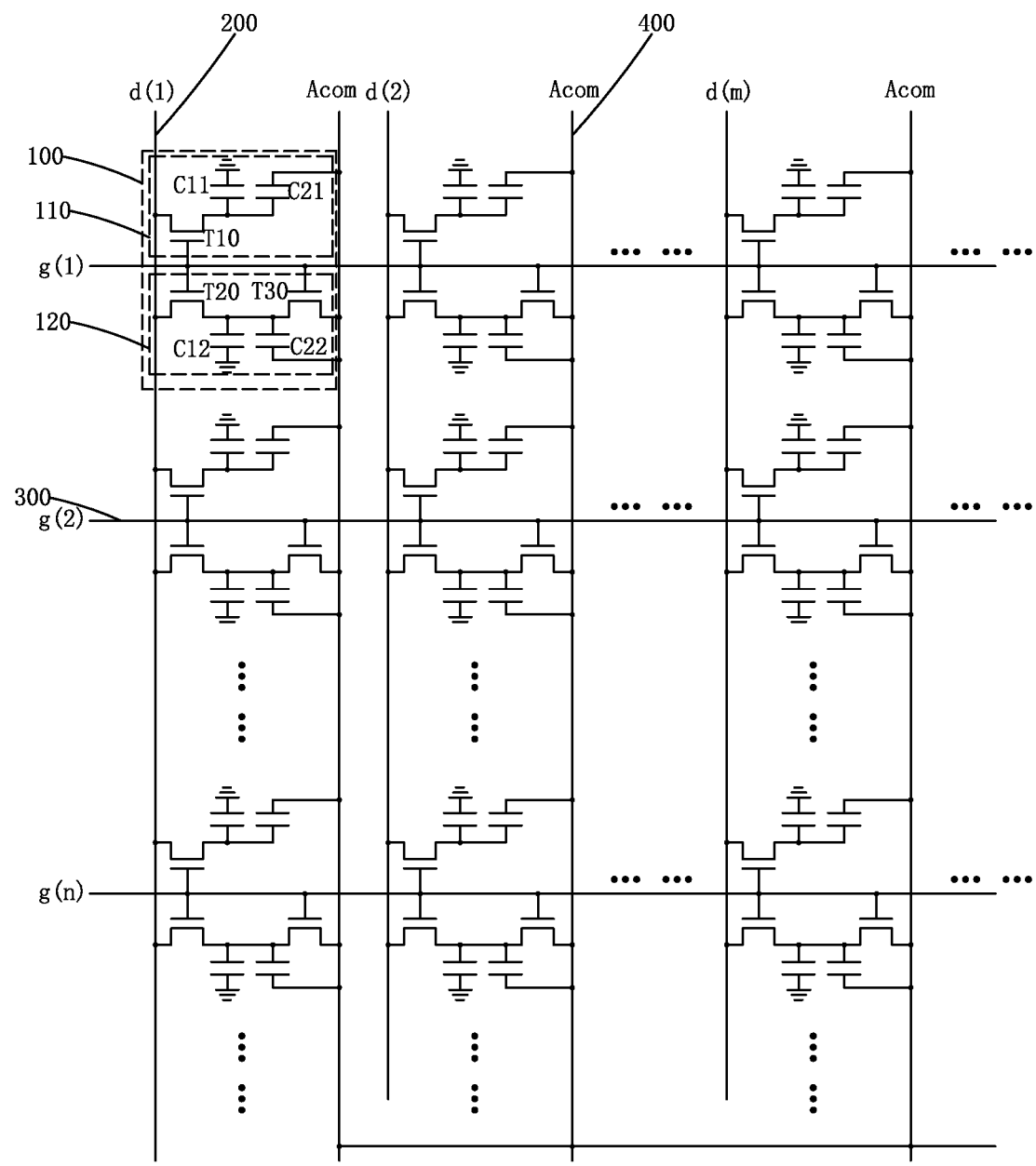
FIG. 1 is a schematic top view showing the structure of a known pixel driving circuit.
Figure 2:
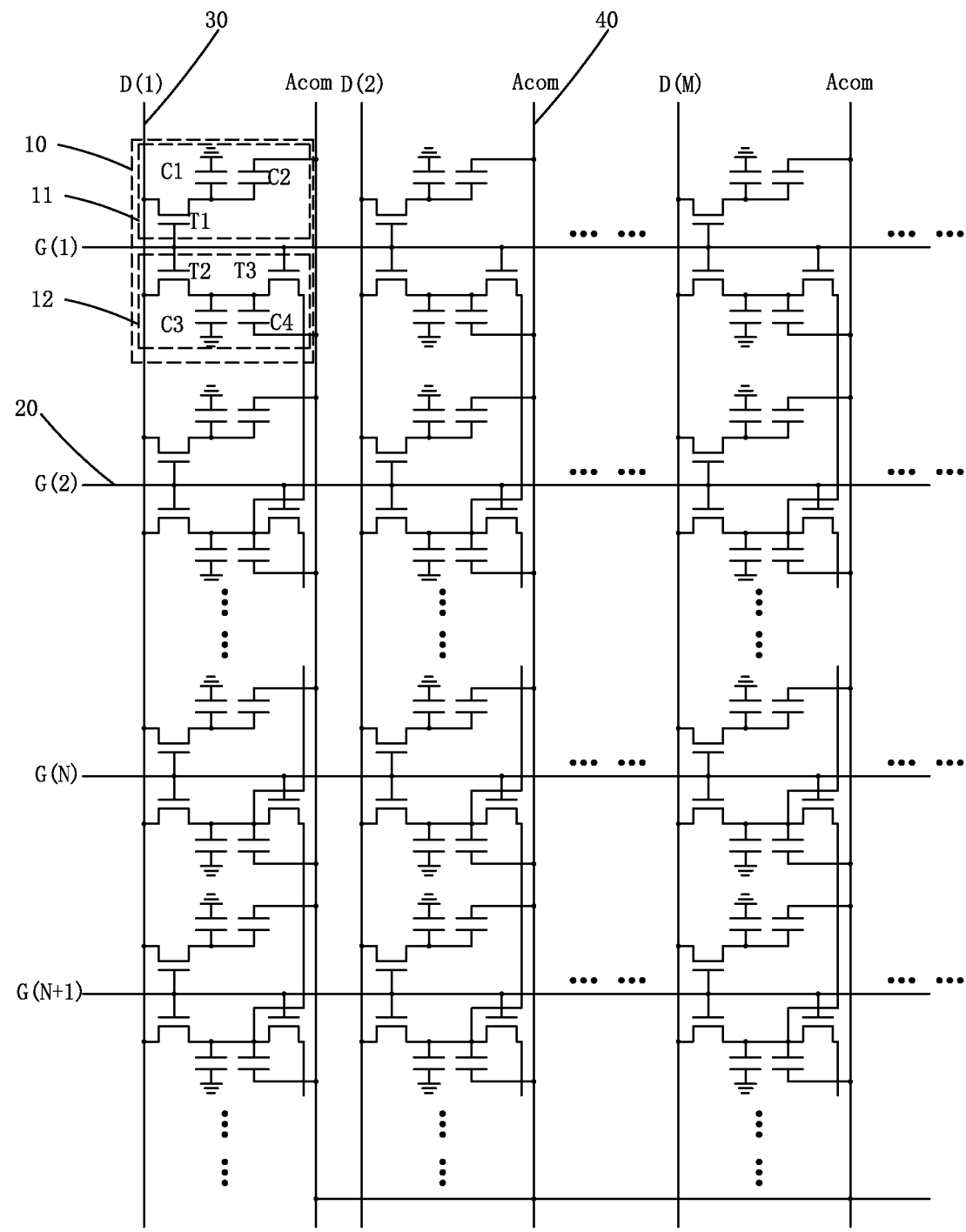
FIG. 2 is a schematic view showing the structure of a pixel driving circuit of the present invention.
Figure 3:
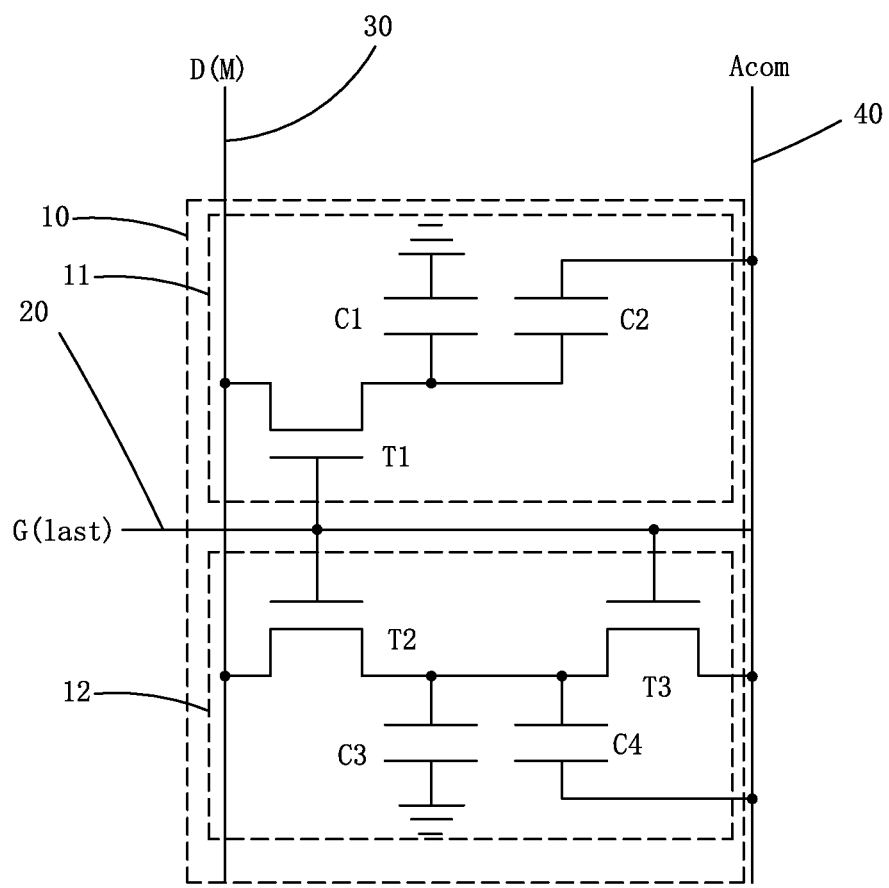
FIG. 3 is a schematic view of the circuit of the last sub-pixel row of a preferred embodiment of the present invention.
Figure 4:
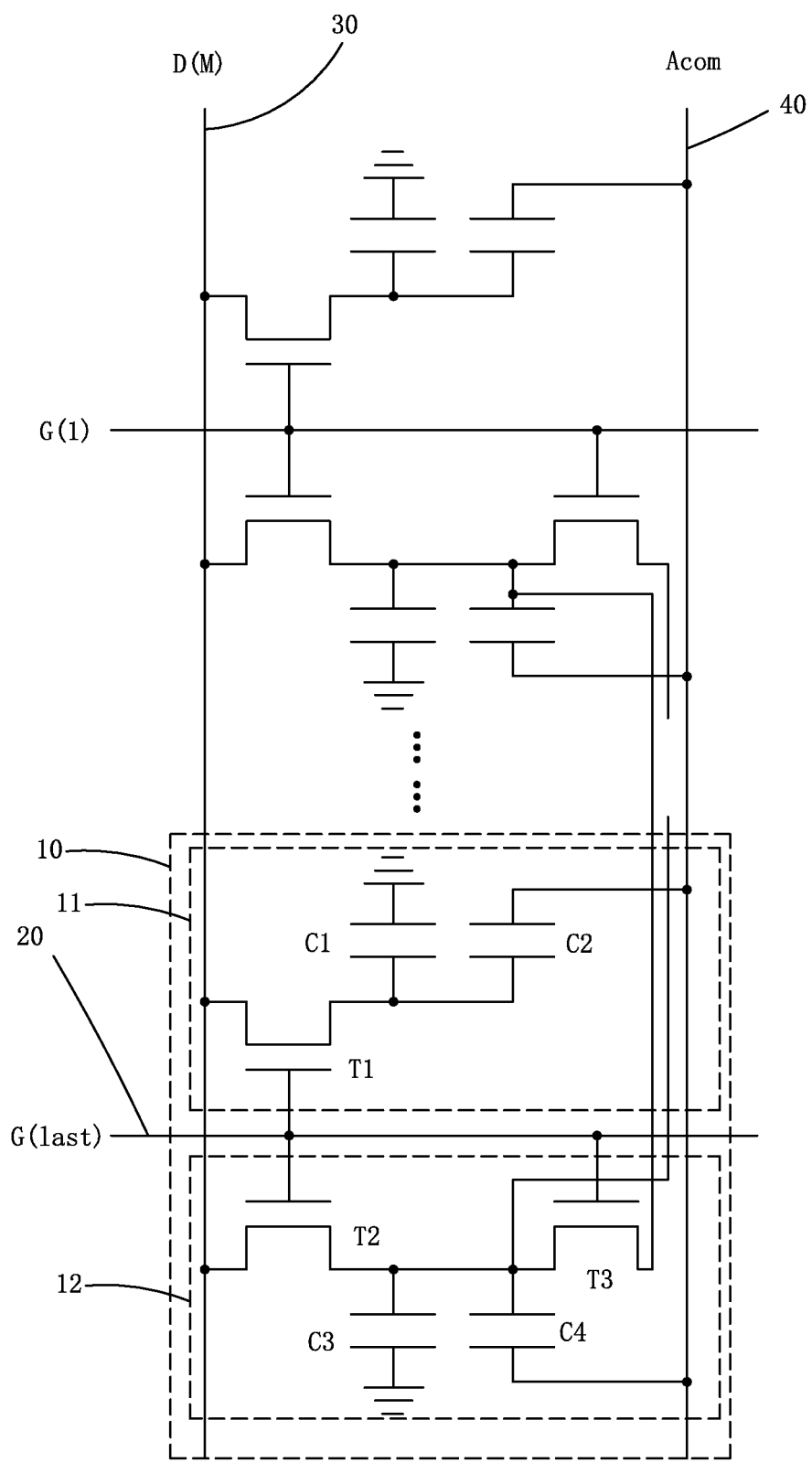
FIG. 4 is a schematic view of the circuit of the connection of M-th sub-pixel of the last row and M-th sub-pixel of the first row of another preferred embodiment of the present invention.

Refer to FIG. 2, and also FIG. 3 and FIG. 4. The present invention provides a pixel driving circuit, comprising: a plurality of sub-pixels 10 arranged in an array, a plurality of scan lines 20 (G(1), G(2), . . . , G(N), G(N+1), . . . ) respectively corresponding to a plurality of rows of sub-pixels 10, a plurality of data lines 30 (D(1), D(2), . . . , D(M), . . . ) respectively corresponding to a plurality of columns of sub-pixels 10, and an array substrate common voltage line 40.

The sub-pixel comprises: a first thin film transistor (TFT) T1, a first liquid crystal (LC) capacitor C1, a first storage capacitor C2, a second TFT T2, a third TFT T3, a second LC capacitor C3, and a second storage capacitor C4. The area where the first TFT T1, the first LC capacitor C1, and the first storage capacitor C2 are located is a main area 11 of the sub-pixel 10, and the area where second TFT T2, the third TFT T3, and the second LC capacitors C3 and the second storage capacitor C4 are located is a sub-area 12 of the sub-pixel 10.

In each sub-pixel 10, the first TFT T1 has a gate electrically connected to a corresponding scan line 20, a source electrically connected to a corresponding data line 30, and a drain electrically connected to a first end of the first LC capacitor C1; the first LC capacitor C1 has a second end connected to a color filter (CF) substrate common voltage. The first storage capacitor C2 has a first end electrically connected to the first end of the first LC capacitor C1, and a second end electrically connected to the array substrate common voltage line 40. The second TFT T2 has a gate electrically connected to a corresponding scan line 20, a source electrically connected to a corresponding data line 30, and a drain electrically connected to a first end of the second LC capacitor C3; the second LC capacitor C3 has a second end electrically connected to the CF substrate common voltage. The second storage capacitor C4 a first end electrically connected to the first end of the second LC capacitor C3, and a second end electrically connected to the array substrate common voltage line 40. The third TFT T3 has a gate electrically connected to a corresponding scan line 20, and a source electrically connected to the first end of the second LC capacitor C3.

For an integer N, except for the last row of sub-pixels 10, in the N-th sub-pixel row, the drain of the third TFT T3 of each sub-pixel is electrically connected to the first end of the second LC capacitor C3 of a corresponding sub-pixel 10 in the (N+1)th row of sub-pixels 10.

Specifically, as shown in FIG. 2, for an integer M, except the last row of sub-pixels 10, the drain of the third TFT T3 of the N-th row, M-th column sub-pixel is electrically connected to the first end of the second LC capacitor C3 of the (N+1)th row, M-th column sub-pixel 10.

Specifically, the array substrate common voltage line 40 receives an array substrate common voltage Acom.

Specifically, the second end of the first LC capacitor C1 is grounded, the second end of the second LC capacitor C3 is grounded, and the CF substrate common voltage is a ground voltage. Clearly, in other embodiments, the CF substrate common voltage can also be at other voltage values, not limited to the ground voltage.

Specifically, in the embodiment of FIG. 2, the first TFT T1, the second TFT T2, and the third TFT T3 are all N-type TFTs. Clearly, in other embodiments, the first TFT T1, the second TFT T2, and the third TFT T3 are all P-type TFTs.

Specifically, the first TFT T1, the second TFT T2, and the third TFT T3 are all amorphous silicon (a-Si) TFTs, low temperature polysilicon (LTPS) TFTs or oxide semiconductor TFTs.

Optionally, as shown in FIG. 3, in a preferred embodiment of the present invention, the drains of the third TFTs T3 of the last row of sub-pixels are all electrically connected to the array substrate common voltage line 40. That is, when the third TFT T3 of the last row of sub-pixels 10 is turned on, the voltage of the first end of the second LC capacitor C3 of the last row of sub-pixels 10 is released to the array substrate common voltage line 40. In this embodiment, since only the drain of the third TFT T3 of the last row of sub-pixels 10 is electrically connected to the array substrate common voltage wire 40, the voltage at the array substrate common voltage line 40 is less affected.

Optionally, as shown in FIG. 4, in another preferred embodiment of the present invention, in the last row of sub-pixels 10, the drain of the third TFT T3 of each sub-pixel 10 is electrically connected to the first end of the second LC capacitor C3 of a corresponding sub-pixel 10 of the first row of sub-pixels 10. Moreover, the drain of the third TFT T3 of the M-th sub-pixel 10 of the last row is electrically connected to the first end of the second LC capacitor C3 of the sub-pixel 10 of the M-th sub-pixel of the first row; that is, when the third TFT T3 of the last row of sub-pixels is turned on, the voltage of the first end of the second LC capacitor C3 of the last row of sub-pixels 10 is correspondingly released to the first end of the second LC capacitor C3 of the first row of sub-pixels 10.

It should be noted that, taking the embodiment in FIG. 2 as an example, when the pixel driving circuit of the present invention performs driving, the scan signals are sequentially supplied to the plurality of scan lines 20 to drive the plurality of rows of sub-pixels 10 line-by-line. When the scan signal on the N-th scan line G(N) controls the first TFT the N-th row of the sub-pixels 10 to turn on, the data signal voltage of the plurality of data lines 30 are written into the N-th row sub-pixels 10. For the M-th sub-pixel 10 of the N-th row, the data signal voltage is written into the first end of the first LC capacitor C1 through the M-th data line D(M) and the turned-on first TFT T1, and the data signal voltage is written into the first end of the second LC capacitor C3 through the M-th data line D(M) and the turned-on second TFT T2. And at this point, the voltage of the first end of the second LC capacitor C3 is released to the first end of the second LC capacitor C3 of M-th sub-pixel 10 of the (N+1)th row through the turned-on third TFT T3, so that the voltage difference between the two ends of the first LC capacitor C1 of the M-th sub-pixel 10 of the N-th row is different from the voltage difference between the two ends of the second LC capacitor C3, thereby achieving the effect of eliminating the color-shift at large view angle. Compared to the prior art, wherein the voltage at the first end of the second LC capacitor is released to the array substrate common voltage line, the present invention does not affect the array substrate common voltage Acom on the array substrate common voltage line 40, which effectively ensures the consistent voltage value of each area of the array substrate common voltage line 40, to ensure the quality of the display. Subsequently, the scan signal on the (N+1)th scan line G(N+1) controls the first TFT T1, the second TFT T2, and the third TFT T3 of the (N+1)th row of sub-pixels 10 to turn on, the data signal voltage is written into the (N+1)th row of sub-pixels 10 through the plurality of data lines 30, so that the voltage of the first end of the second LC capacitor C3 of the (N+1)th row of sub-pixels 10 returns to the correct voltage value again. Therefore, releasing the voltage of the first end of the second LC capacitor C3 of the N-th row of sub-pixels 10 to the first end of the second LC capacitor C3 of the (N+1)th row of sub-pixels 10 does not affect the voltage difference across the second LC capacitor C3 of the (N+1)th row of sub-pixels 10, that is, the normal display is not affected.

Based on the same concept, the present invention also provides an LCD device, which comprises the above pixel driving circuit. The details of the pixel driving circuit will not be repeated herein.

It should be noted that, taking an LCD comprising the pixel driving circuit of the embodiment in FIG. 2 as an example, when the scan signal on the N-th scan line G(N) controls the first TFT the N-th row of the sub-pixels 10 to turn on, the data signal voltage of the plurality of data lines 30 are written into the N-th row sub-pixels 10. For the M-th sub-pixel 10 of the N-th row, the data signal voltage is written into the first end of the first LC capacitor C1 through the M-th data line D(M) and the turned-on first TFT T1, and the data signal voltage is written into the first end of the second LC capacitor C3 through the M-th data line D(M) and the turned-on second TFT T2. And at this point, the voltage of the first end of the second LC capacitor C3 is released to the first end of the second LC capacitor C3 of M-th sub-pixel 10 of the (N+1)th row through the turned-on third TFT T3, so that the voltage difference between the two ends of the first LC capacitor C1 of the M-th sub-pixel 10 of the N-th row is different from the voltage difference between the two ends of the second LC capacitor C3, thereby achieving the effect of eliminating the color-shift at large view angle. Compared to the prior art, wherein the voltage at the first end of the second LC capacitor is released to the array substrate common voltage line, the present invention does not affect the array substrate common voltage Acom on the array substrate common voltage line 40, which effectively ensures the consistent voltage value of each area of the array substrate common voltage line 40, to ensure the quality of the display. Subsequently, the scan signal on the (N+1)th scan line G(N+1) controls the first TFT T1, the second TFT T2, and the third TFT T3 of the (N+1)th row of sub-pixels 10 to turn on, the data signal voltage is written into the (N+1)th row of sub-pixels 10 through the plurality of data lines 30, so that the voltage of the first end of the second LC capacitor C3 of the (N+1)th row of sub-pixels 10 returns to the correct voltage value again. Therefore, releasing the voltage of the first end of the second LC capacitor C3 of the N-th row of sub-pixels 10 to the first end of the second LC capacitor C3 of the (N+1)th row of sub-pixels 10 does not affect the voltage difference across the second LC capacitor C3 of the (N+1)th row of sub-pixels 10, that is, the normal display is not affected.

In summary, the pixel driving circuit of the present invention electrically connects the drain of the third TFT of each sub-pixel in the N-th sub-pixel row to the first end of the second LC capacitor of a corresponding sub-pixel of the (N+1)th row. When driving, when scanning the N-th sub-pixel row, the third TFT of the N-th sub-pixel row turns on to release the voltage at the first end of the second LC capacitor of the N-th sub-pixel row to the first end of the second LC capacitor of the (N+1)th sub-pixel row, and does not affect the voltage on the array substrate common voltage line, thereby effectively ensuring consistent voltage value for various areas on the array substrate common voltage line. When applied to LCD device, the invention can improve the display quality of the LCD device. The LCD device of the present invention provides the same voltage value for each area on the array substrate common voltage line, and the display quality is good.

It should be noted that each of the embodiments in this specification is described in a progressive manner, each of which is primarily described in connection with other embodiments with emphasis on the difference parts, and the same or similar parts may be seen from each other. For the device embodiment, since it is substantially similar to the method embodiment, the description is relatively simple and the relevant description may be described in part of the method embodiment.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A pixel driving circuit, comprising: a plurality of sub-pixels arranged in an array, a plurality of scan lines respectively corresponding to a plurality of rows of sub-pixels, a plurality of data lines respectively corresponding to a plurality of columns of sub-pixels, and an array substrate common voltage line;
the sub-pixel comprising: a first thin film transistor (TFT), a first liquid crystal (LC) capacitor, a first storage capacitor, a second TFT, a third TFT, a second LC capacitor, and a second storage capacitor;
in each sub-pixel, the first TFT having a gate electrically connected to a corresponding scan line, a source electrically connected to a corresponding data line, and a drain electrically connected to a first end of the first LC capacitor; the first LC capacitor having a second end connected to a color filter (CF) substrate common voltage; the first storage capacitor having a first end electrically connected to the first end of the first LC capacitor, and a second end electrically connected to the array substrate common voltage line; the second TFT having a gate electrically connected to a corresponding scan line, a source electrically connected to a corresponding data line, and a drain electrically connected to a first end of the second LC capacitor; the second LC capacitor having a second end electrically connected to the CF substrate common voltage; the second storage capacitor having a first end electrically connected to the first end of the second LC capacitor, and a second end electrically connected to the array substrate common voltage line; the third TFT having a gate electrically connected to a corresponding scan line, and a source electrically connected to the first end of the second LC capacitor;
for an integer N, except for the last row of sub-pixels, in the N-th row of sub-pixels, the drain of the third TFT of each sub-pixel being electrically connected to the first end of the second LC capacitor of a corresponding sub-pixel in the (N+1)th row of sub-pixels.

2. The pixel driving circuit as claimed in claim 1, wherein for an integer M, except the last row of sub-pixels, the drain of the third TFT of the N-th row, M-th column sub-pixel is electrically connected to the first end of the second LC capacitor of the (N+1)th row, M-th column sub-pixel.

3. The pixel driving circuit as claimed in claim 1, wherein the array substrate common voltage line receives an array substrate common voltage.

4. The pixel driving circuit as claimed in claim 1, wherein the second end of the first LC capacitor is grounded, the second end of the second LC capacitor is grounded, and the CF substrate common voltage is a ground voltage.

5. The pixel driving circuit as claimed in claim 1, wherein the drain of the third TFT of the last row of sub-pixels is electrically connected to the array substrate common voltage line.

6. The pixel driving circuit as claimed in claim 1, wherein in the last row of sub-pixels, the drain of the third TFT of each sub-pixel is electrically connected to the first end of the second LC capacitor of a corresponding sub-pixel of the first row of sub-pixels.

7. The pixel driving circuit as claimed in claim 6, wherein for an integer M, the drain of the third TFT of the M-th sub-pixel of the last row is electrically connected to the first end of the second LC of the M-th sub-pixel of the first row.

8. The pixel driving circuit as claimed in claim 1, wherein the first TFT, the second TFT, and the third TFT are all N-type TFTs.

9. The pixel driving circuit as claimed in claim 1, wherein the first TFT, the second TFT, and the third TFT are all amorphous silicon (a-Si) TFTs, low temperature polysilicon (LTPS) TFTs or oxide semiconductor TFTs.

10. A liquid crystal display (LCD) device, comprising a pixel driving circuit;
the pixel driving circuit comprising: a plurality of sub-pixels arranged in an array, a plurality of scan lines respectively corresponding to a plurality of rows of sub-pixels, a plurality of data lines respectively corresponding to a plurality of columns of sub-pixels, and an array substrate common voltage line;
the sub-pixel comprising: a first thin film transistor (TFT), a first liquid crystal (LC) capacitor, a first storage capacitor, a second TFT, a third TFT, a second LC capacitor, and a second storage capacitor;

in each sub-pixel, the first TFT having a gate electrically connected to a corresponding scan line, a source electrically connected to a corresponding data line, and a drain electrically connected to a first end of the first LC capacitor; the first LC capacitor having a second end connected to a color filter (CF) substrate common voltage; the first storage capacitor having a first end electrically connected to the first end of the first LC capacitor, and a second end electrically connected to the array substrate common voltage line; the second TFT having a gate electrically connected to a corresponding scan line, a source electrically connected to a corresponding data line, and a drain electrically connected to a first end of the second LC capacitor; the second LC capacitor having a second end electrically connected to the CF substrate common voltage; the second storage capacitor having a first end electrically connected to the first end of the second LC capacitor, and a second end electrically connected to the array substrate common voltage line; the third TFT having a gate electrically connected to a corresponding scan line, and a source electrically connected to the first end of the second LC capacitor;

for an integer N, except for the last row of sub-pixels, in the N-th row of sub-pixels, the drain of the third TFT of each sub-pixel being electrically connected to the first end of the second LC capacitor of a corresponding sub-pixel in the (N+1)th row of sub-pixels.

11. The LCD device as claimed in claim 10, wherein for an integer M, except the last row of sub-pixels, the drain of the third TFT of the N-th row, M-th column sub-pixel is electrically connected to the first end of the second LC capacitor of the (N+1)th row, M-th column sub-pixel.

12. The LCD device as claimed in claim 10, wherein the array substrate common voltage line receives an array substrate common voltage.

13. The LCD device as claimed in claim 10, wherein the second end of the first LC capacitor is grounded, the second end of the second LC capacitor is grounded, and the CF substrate common voltage is a ground voltage.

14. The LCD device as claimed in claim 10, wherein the drain of the third TFT of the last row of sub-pixels is electrically connected to the array substrate common voltage line.

15. The LCD device as claimed in claim 10, wherein in the last row of sub-pixels, the drain of the third TFT of each sub-pixel is electrically connected to the first end of the second LC capacitor of a corresponding sub-pixel of the first row of sub-pixels.

16. The LCD device as claimed in claim 15, wherein for an integer M, the drain of the third TFT of the M-th sub-pixel of the last row is electrically connected to the first end of the second LC of the M-th sub-pixel of the first row.

17. The LCD device as claimed in claim 10, wherein the first TFT, the second TFT, and the third TFT are all N-type TFTs.

18. The LCD device as claimed in claim 10, wherein the first TFT, the second TFT, and the third TFT are all amorphous silicon (a-Si) TFTs, low temperature polysilicon (LTPS) TFTs or oxide semiconductor TFTs.

* * * * *